United States Patent
Zhao et al.

(10) Patent No.: US 11,817,994 B2
(45) Date of Patent: Nov. 14, 2023

(54) TIME SERIES TREND ROOT CAUSE IDENTIFICATION

(71) Applicant: Verizon Media Inc., New York, NY (US)

(72) Inventors: Jifu Zhao, Urbana, IL (US); Kevin Andrew Perkins, Champaign, IL (US); Mithilesh Nanjamanaidu Srinivasan Rangavadivel, Champaign, IL (US); Matthew Robert Ahrens, Champaign, IL (US)

(73) Assignee: YAHOO ASSETS LLC, New York, NY (US)

( * ) Notice: Subject to any disclaimer, the term of this patent is extended or adjusted under 35 U.S.C. 154(b) by 49 days.

(21) Appl. No.: 17/156,990

(22) Filed: Jan. 25, 2021

(65) Prior Publication Data
US 2022/0239549 A1 Jul. 28, 2022

(51) Int. Cl.
| | |
|---|---|
| H04L 41/0631 | (2022.01) |
| H04L 41/069 | (2022.01) |
| H04L 43/04 | (2022.01) |
| H04L 43/067 | (2022.01) |
| H04L 41/0604 | (2022.01) |

(52) U.S. Cl.
CPC ........ *H04L 41/064* (2013.01); *H04L 41/0604* (2013.01); *H04L 41/069* (2013.01); *H04L 43/04* (2013.01); *H04L 43/067* (2013.01)

(58) Field of Classification Search
None
See application file for complete search history.

(56) References Cited

U.S. PATENT DOCUMENTS

| | | | |
|---|---|---|---|
| 9,971,877 B1 * | 5/2018 | Najmi | G06Q 10/06 |
| 11,126,612 B2 * | 9/2021 | Gaber | G06F 16/2228 |
| 2011/0078301 A1 * | 3/2011 | Dehaan | H04L 63/1433 |
| | | | 709/224 |

(Continued)

FOREIGN PATENT DOCUMENTS

| | | | | |
|---|---|---|---|---|
| EP | 3163445 A1 * | 5/2017 | ......... | G06F 11/0709 |
| WO | WO-2010044797 A1 * | 4/2010 | ......... | G06F 11/0709 |

(Continued)

OTHER PUBLICATIONS

Bailey et al., "Weighted and Unweighted Correlation Methods for Large-Scale Educational Assessment: wCorr Formulas", American Institutes for Research—NAEP Working Paper #2018-01, NCES Data R Project Series #02, Apr. 2018 (Year: 2018).*

*Primary Examiner* — Bharat Barot
*Assistant Examiner* — Sandarva Khanal
(74) *Attorney, Agent, or Firm* — Cooper Legal Group LLC

(57) ABSTRACT

One or more computing devices, systems, and/or methods for time series trend root cause identification are provided. In particular, an overall trend of multi-dimensional time series data and element trends for measured elements of dimensions within the multi-dimensional time series data is identified. Weighted correlations between the element trends of the measured elements and the overall trend are calculated. The weighted correlations of the measured elements and aggregate weighted correlations of measured element combinations are evaluated to identify a set of measured elements having a threshold correlation to the trend.

20 Claims, 13 Drawing Sheets

(56) References Cited

U.S. PATENT DOCUMENTS

| | | | | |
|---|---|---|---|---|
| 2011/0231582 | A1* | 9/2011 | Uysal | G06F 11/008 710/15 |
| 2011/0320388 | A1* | 12/2011 | Wong | G05B 23/0232 706/12 |
| 2012/0185481 | A1* | 7/2012 | Bjork | G06Q 30/02 707/E17.089 |
| 2012/0185735 | A1* | 7/2012 | Sambamurthy | G06F 11/3452 714/E11.2 |
| 2014/0068348 | A1* | 3/2014 | Mondal | G06F 11/079 714/45 |
| 2016/0258845 | A1* | 9/2016 | Mankovskii | G01M 99/008 |
| 2017/0005886 | A1* | 1/2017 | Dade | H04L 43/04 |
| 2017/0076202 | A1* | 3/2017 | George | G06N 5/045 |
| 2017/0372323 | A1* | 12/2017 | Stern | H04M 3/5235 |
| 2018/0027004 | A1* | 1/2018 | Huang | H04L 63/1425 726/23 |
| 2018/0115455 | A1* | 4/2018 | Serrano Garcia | H04L 43/0817 |
| 2018/0191755 | A1* | 7/2018 | Monaco | H04L 63/1425 |
| 2018/0196837 | A1* | 7/2018 | Anand | G06F 11/3409 |
| 2018/0276063 | A1* | 9/2018 | Mendes | G06F 11/3409 |
| 2018/0307481 | A1* | 10/2018 | Ganesan | G06F 11/3664 |
| 2019/0155672 | A1* | 5/2019 | Wang | G06F 11/0709 |
| 2019/0260688 | A1* | 8/2019 | Anand | G06F 11/3006 |
| 2019/0286504 | A1* | 9/2019 | Muntés-Mulero | G06F 11/0709 |
| 2019/0379589 | A1* | 12/2019 | Ryan | G06F 17/142 |
| 2021/0026747 | A1* | 1/2021 | Garion | G06F 11/3476 |
| 2021/0406148 | A1* | 12/2021 | Bertran | G06F 11/3006 |

FOREIGN PATENT DOCUMENTS

| | | | | |
|---|---|---|---|---|
| WO | WO-2016175776 A1 * | 11/2016 | | G06F 17/18 |
| WO | WO-2021048311 A * | 3/2021 | | H04L 41/064 |

* cited by examiner

TIME SERIES TREND ROOT CAUSE IDENTIFICATION

BACKGROUND

Time series data may be generated by various types of environments, such as a computing environment of a service provider, a manufacturing environment, etc. The time series data may correspond to user interaction data of users interacting with a service, an application, a website, or other types of content, system diagnostic data, manufacturing data, software service data, cloud computing operation data, etc. The time series data may be indicative of trends, such as an increasing trend of users visiting a website or a decreasing trend of users interacting with a service.

SUMMARY

In accordance with the present disclosure, one or more computing devices and/or methods for time series trend root cause identification are provided. A set of data associated with a trend may be identified. In an example, the set of data may correspond to information relating to users and/or client devices accessing a service (e.g., users accessing email, a website, a cloud computing platform, a service provider, a social network, etc.). It may be appreciated that the set of data may correspond to a variety of other types of information, such as user interaction data (e.g., a user viewing content, purchasing a product, etc.), system diagnostic data, manufacturing data (e.g., output of a manufacturing plant, operating parameters of equipment, etc.), software service data, cloud computing operation data, etc. The trend may corresponding to an increasing trend, a decreasing trend, or any other type of trend. The set of data may be organized into multi-dimensional time series data comprising one or more dimensions of measured elements. For example, a state dimension may have 50 measured elements corresponding to states within which users live, an age group dimension may have 10 measurement elements corresponding to 10 different age groups of users that accessed a service, an operating system dimension may have 3 measured elements corresponding to 3 different operating system types of devices used by users to access the service, and/or a wide variety of other dimensions of constituent measured elements. In an example, the set of data may indicate that a user within an age group of 20 to 30 and living in Florida accessed a service at a particular point in time (or over a time range) using a client device having a particular operating system.

The multi-dimensional time series data may be evaluated to identify an overall trend of the multi-dimensional time series data, such as a decreasing trend of a service being utilized over a particular timespan. The techniques provided herein are tailored to identify one or more root causes of the overall trend, which may be caused by factors relating to various dimensions and/or measured elements. Accordingly, element trends for each the measured elements of the dimensions may be identified. For example, an element trend of s measured element associated with a particular type of browser may indicate a decreasing trend of a particular type of browser accessing the service, which may be indicative of a problem or issue related to that type of browser being able to access the service.

Weighted correlations between the element trends of the measured elements and the overall trend may be calculated. In some embodiments, the weighted correlations may correspond to Pearson weighted correlations. The more an element trend of a measured element matches the overall trend, the larger the weighted correlation (e.g., both trends are decreasing at a similar rate). The more an element trend of a measured element does not match the overall trend, the smaller the weighted correlation (e.g., one trend is decreasing while the other trend is increasing or decreasing at a substantially different rate).

The weighted correlations of the measured elements and aggregate weighted correlations of measured element combinations may be evaluated to identify a set of measured elements having a threshold correlation to the trend. An aggregate weighted correlation may correspond to a correlation of multiple measured elements in relation to the trend, such as the overall trend. Only certain measured elements may be consider based upon those measured elements having the threshold correlation. The evaluation may be performed on a dimension by dimension basis. For example, a state dimension may have 50 measured elements that each have a weighted correlation. On an element by element basis for the state dimension, if a weighted correlation of a measured element exceeds the threshold correlation, then the measured element is included within a candidate set for the state dimension, otherwise the measured element is excluded. As measured elements are added into the candidate set, the aggregate weighted correlations are calculated (or re-calculated) for the combinations of measured elements within the candidate set. Once the evaluation of the state dimension is done, a candidate set for a next dimensions is created and the next dimensions is evaluated. One or more dimensions corresponding to measured element combinations with the largest aggregate weighted correlations may be identified as root causes of the trend, and thus the set of measured elements may correspond to the measured elements within the candidate sets of those dimensions. In this way, those dimensions, the set of measured elements, the weighted correlations of the set of measured elements, aggregate weighted correlations of the dimensions, and/or other information such as various graphs may be provided through a user interface to describe the root causes of the trend.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
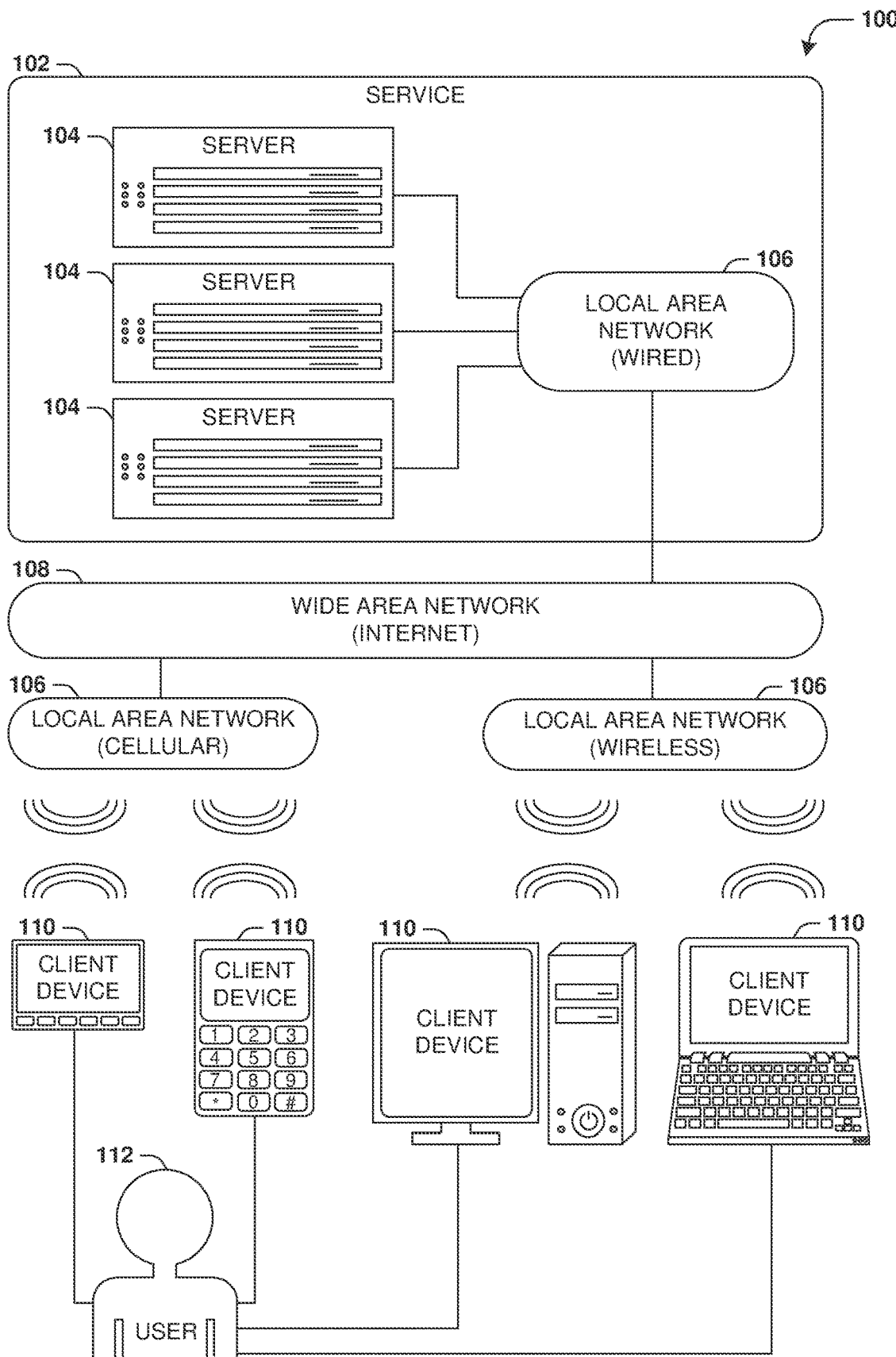
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
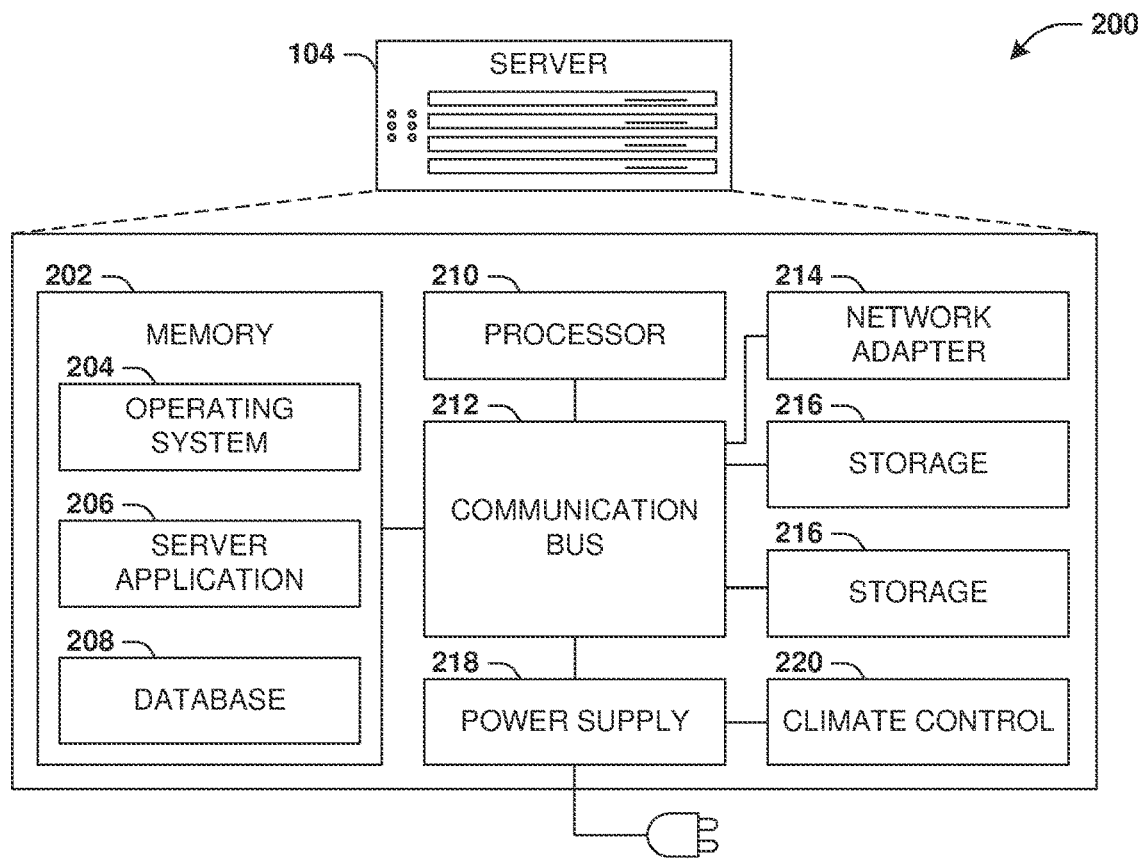
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
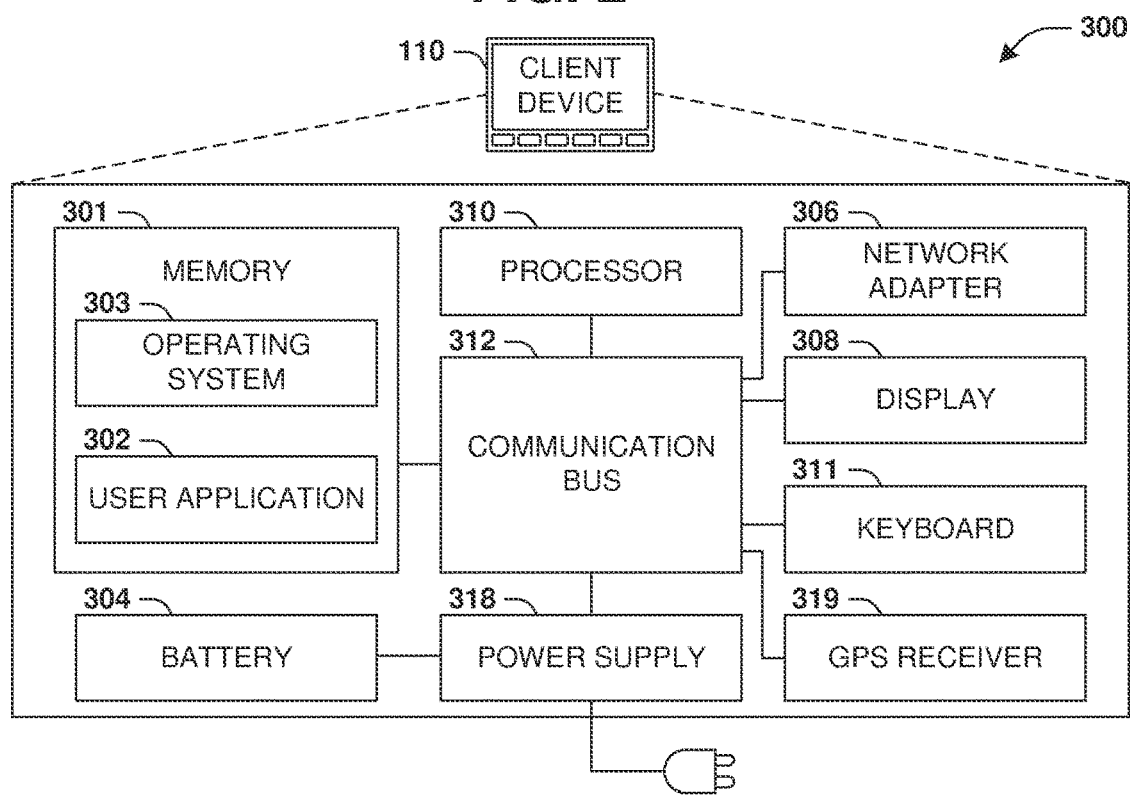
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for time series trend root cause identification are provided. Many service providers, such as website providers, application hosts, cloud computing environments, content providers, manufacturing services and factories, business service providers, etc., may provide various types of services to clients and client devices. The operation of these service providers and the access to the service providers by the client devices may result in time series data. In an example, the time series data may comprise information corresponding to a time during which a client device access a service provider, a time at which a system component is operational (e.g., a piece of manufacturing equipment being operational), demographic information of a user of the client device (e.g., an age, gender, residency, social network profile information or other profile information, etc.), information about the client device (e.g., an operating system type, an operating system version, an application version, a location of the client device during access to the service provider, a browser type used to access a website hosted by the service provider, etc.), an identifier of a publisher of content being accessed by the client device, information about the service provider, actions performed through the service provider (e.g., did the user view a video provided to the user, did the user mark an email as spam, did the user click on a link within a recommendation/push notification, did the user skip over viewing content provided to the client device, etc.), and/or a wide variety of other information.

Trends within the time series data may be indicative of operational issues (e.g., a failure or degraded performance of hardware, software, and/or equipment of a service provider or manufacturer, access issues of certain client devices being unable to access a service provider or having degraded access or performance, etc.) or other influences (e.g., increased access to a shopping website during black Friday). Diagnosing the root cause of the trend may require a substantial amount of manual effort to review the time series data, perform anomaly detection, and/or perform various analysis and testing. Diagnosis the root cause of the trend can become impractical or even impossible due to the large number of dimensions (e.g., an operating system type, a browser type, a device location, a user age group, a user gender, a time of access, whether a particular type of user action was performed, etc.) and measured elements to review and correlate. As a simplified example, time series data corresponding to recommendations of content provided to client devices may have dimensions and attributes relating to 50 states, 100 content providers of the content, 10 platforms through which the content is accessible (e.g., a website, an email platform, a social network application, etc.), and 10 age groups. Combining these attributes results in 50*100*10*10=500,000 dimension combinations. This means that an exhaustive search would be computationally too expensive and impossible because of the amount of computing resources and/or human effort otherwise required to identify the root cause of a trend from the 500,000 dimension combinations of measured elements and values of such measured elements.

Accordingly, as provided herein, automated data-driven root cause analysis is provided that dramatically reduces computational overhead and manual efforts for identifying root causes of trends. The automated data-driven root cause analysis can dramatically reduce the dimensional search space without human interaction. Accordingly, the reduced dimensional search space can be more efficiently processed with less computational resources, thus improve the operation of a computing device configured to implement the automated data-driven root cause analysis. The automated data-driven root cause analysis may be implemented to proactively identify issues in a scaled out manner for large amounts of time series data. The automated data-driven root cause analysis provides a search mechanism tailored to dramatically reduce the search space of all dimensions and measured elements (attributes), which results in an efficient solution for identifying root causes of trends that may be indicative of issues to solve for improved operation of service providers (e.g., a service provider may fix a software bug that was causing users with a certain browser type to have degraded performance when accessing the service provider, which may be determined by the service provider as a solution to a root cause of the issue). This results in reliable and smooth operation of service providers because issues can be proactively identified and addressed utilizing far less computing resources and manual effort.

In an example of multi-dimensional time series trends, a multi-dimensional time series trend may correspond to a persistent increasing or decreasing direction of data (e.g., a decrease in users accessing a service, an increase in users viewing a website, etc.). For example, during a shopping holiday season, a number of impressions of content recommendations being provided to users may increase, which would be an increasing trend. This trend may have a root cause associated with the holiday shopping season. In other instances, an increasing or decreasing trend may be indicative of a problem. For example, unreliable connection issues to a service provider from certain types of browsers from a certain location may result in decreased traffic to the service provider, while traffic to the service provider from other browser types or other locations may remain relatively constant. Thus, the combination of the browser type and the location may be a root cause of the traffic decline to the service provider. In another example, a content recommendation provider may observe that a number of online orders is increasing. The automated data-driven root cause analysis may be executed to understand the reason behind the increasing trend, which may help the content recommendation provider further tailor how content recommendations are constructed for taking advantage of the increasing trend.

Figure 4:
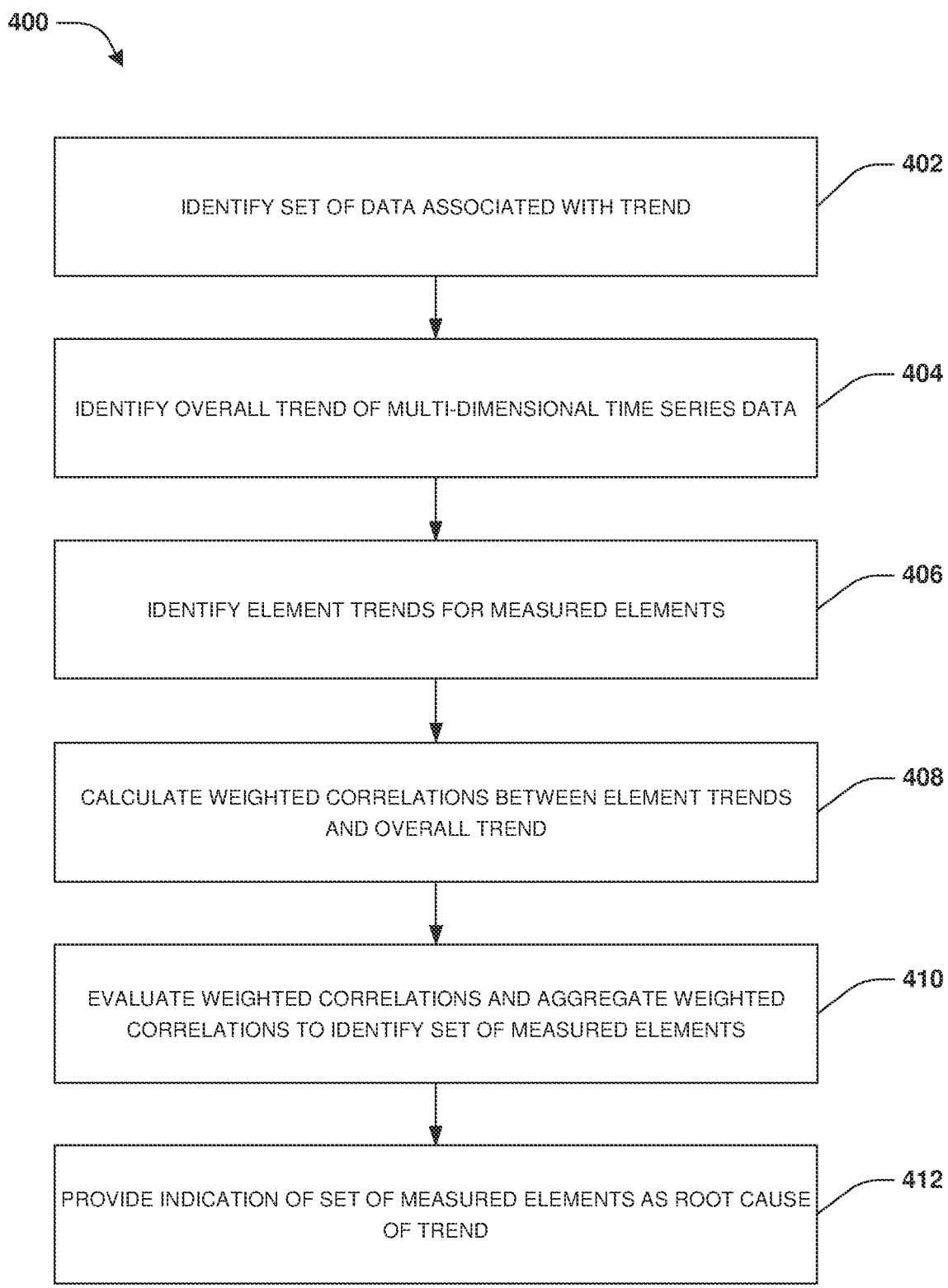
FIG. 4 is a flow chart illustrating an example method for time series trend root cause identification.
Figure 5A:
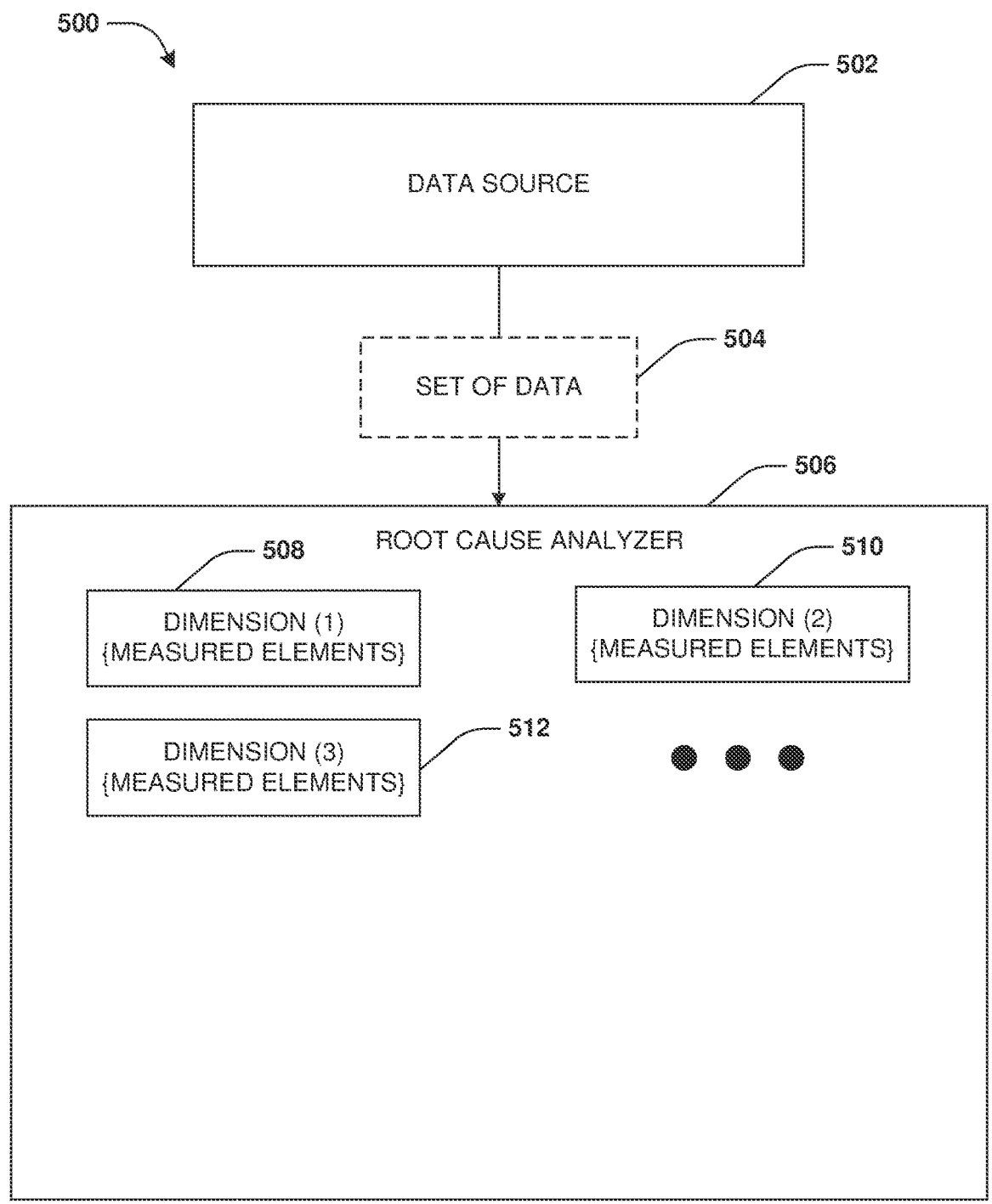
FIG. 5A is a component block diagram illustrating an example system for time series trend root cause identification, where dimensions and measured items of dimensions are identified from multi-dimensional time series data derived from a set of data.

One embodiment of time series trend root cause identification is illustrated by an exemplary method 400 of FIG. 4 and is further described in conjunction with system 500 of FIGS. 5A-5G. A root cause analyzer 506 may implement automated data-driven root cause analysis to identify the root causes of trends within multi-dimensional time series data, as illustrated by FIG. 5A. The root cause analyzer 506 may be hosted by a computing device, a virtual machine, hardware, software, or a combination thereof. The root cause analyzer 506 may implement the automated data-driven root cause analysis in a manner that reduces the dimensional search space of dimensions and measure elements (attributes) that are processed for identifying root causes of a trend, thus reducing computational resource utilization and improving the operation of a computing device hosting the root cause analyzer 506.

The root cause analyzer 506 may execute the automated data-driven root cause analysis to obtain a set of data 504 from a data source 502, during operation 402 of method 400 of FIG. 4. For example, one or more service providers may generate time series data that is stored within the data source 502. The time series data may comprise information related to operation of a service provider, information about client devices that access the service provider, content interacted with by clients of the client devices, actions performed by the clients in association with the service provider, timestamps of such actions and interactions, information about the clients (user), etc. The set of data 504 may be identified and extracted from the data source 502 based upon the set of data 504 corresponding to a particular timespan during which a trend may have occurred.

The root cause analyzer 506 may organize the set of data 504 from the data source 502 into multi-dimensional time series data comprising one or more dimensions of measured elements. The multi-dimensional time series data may correspond to user interaction data, system diagnostic data, manufacturing and operational data, software service data, cloud computing operation data, etc. In an example, the multi-dimensional time series data may comprise a first dimension 508 (e.g., a state dimension) with measured elements (e.g., states from which client devices accessed the service provider). The multi-dimensional time series data may comprise a second dimension 510 (e.g., an age group dimension) with measured elements (e.g., a first age group of ages from 0 to 17, a second age group of ages from 18 to 25, a third age group of ages from 36 to 49, a fourth age group of ages from 50 to 60, etc.). The multi-dimensional time series data may comprise a third dimension 512 (e.g., an operating system type dimension) with measured elements (e.g., different types of operating systems of client devices used to access the service provider). In this way, a wide variety of dimensions may be identified by the root cause analyzer 506 from the set of data 504 for organizing the set of data 504 into the multi-dimensional time series data as dimensions and measured elements of the dimensions.

Figure 5B:
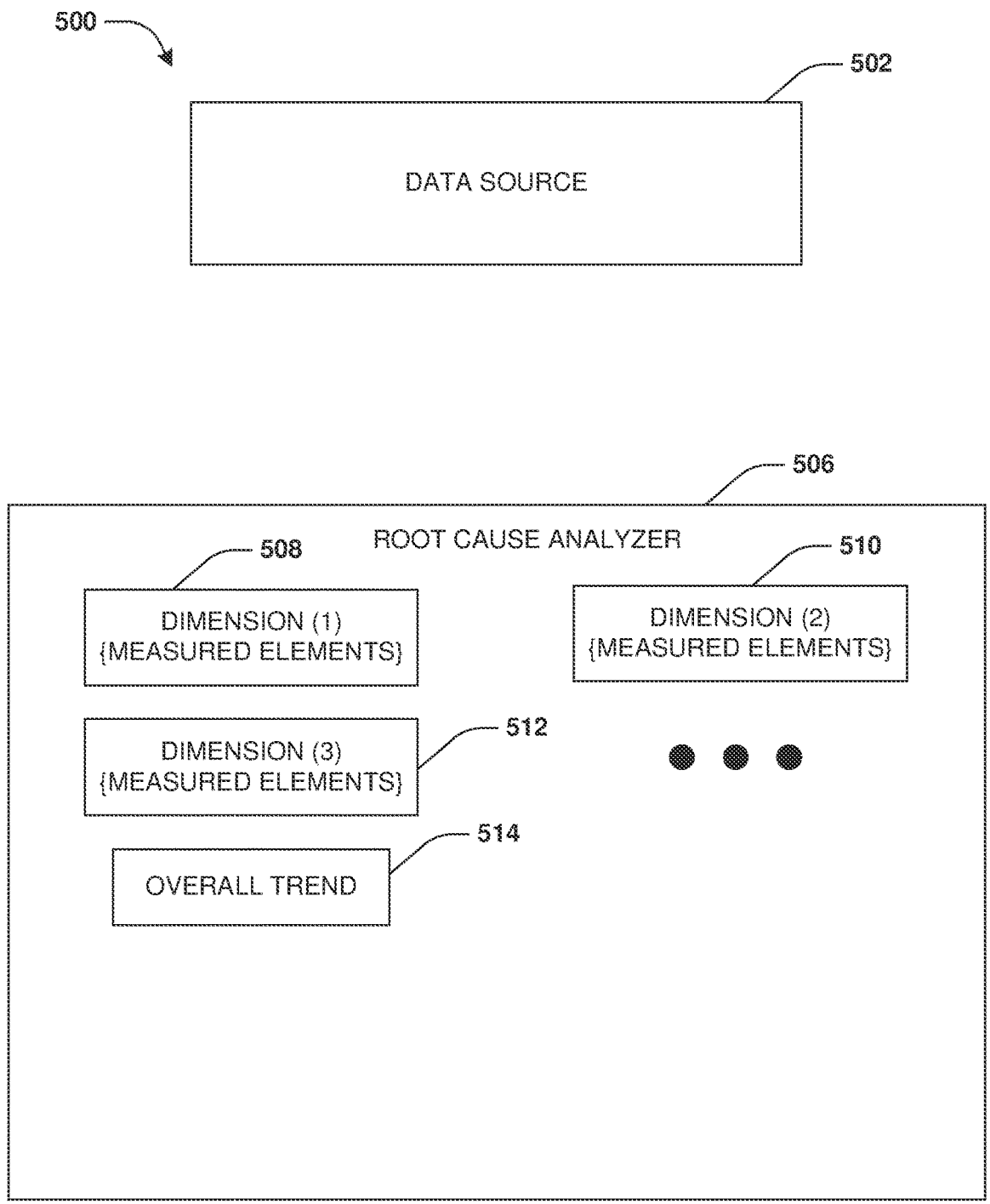
FIG. 5B is a component block diagram illustrating an example system for time series trend root cause identification, where an overall trend is identified.

During operation 404 of method 400 of FIG. 4, the root cause analyzer 506 may evaluate the multi-dimensional time series data to identify an overall trend 514 of the multi-dimensional time series data, as illustrated by FIG. 5B. In an example, the overall trend 514 may correspond to an increasing trend, a decreasing trend, or some other trend in relation to some aspect associated with the service provider. For example, the overall trend 514 may correspond to an increasing trend of users accessing a website. In another example, the overall trend 514 may correspond to a decreasing trend of users posting social network posts through a social network service. It may be appreciated that a wide variety of different types of trends may be identified as the overall trend 514.

Figure 5C:
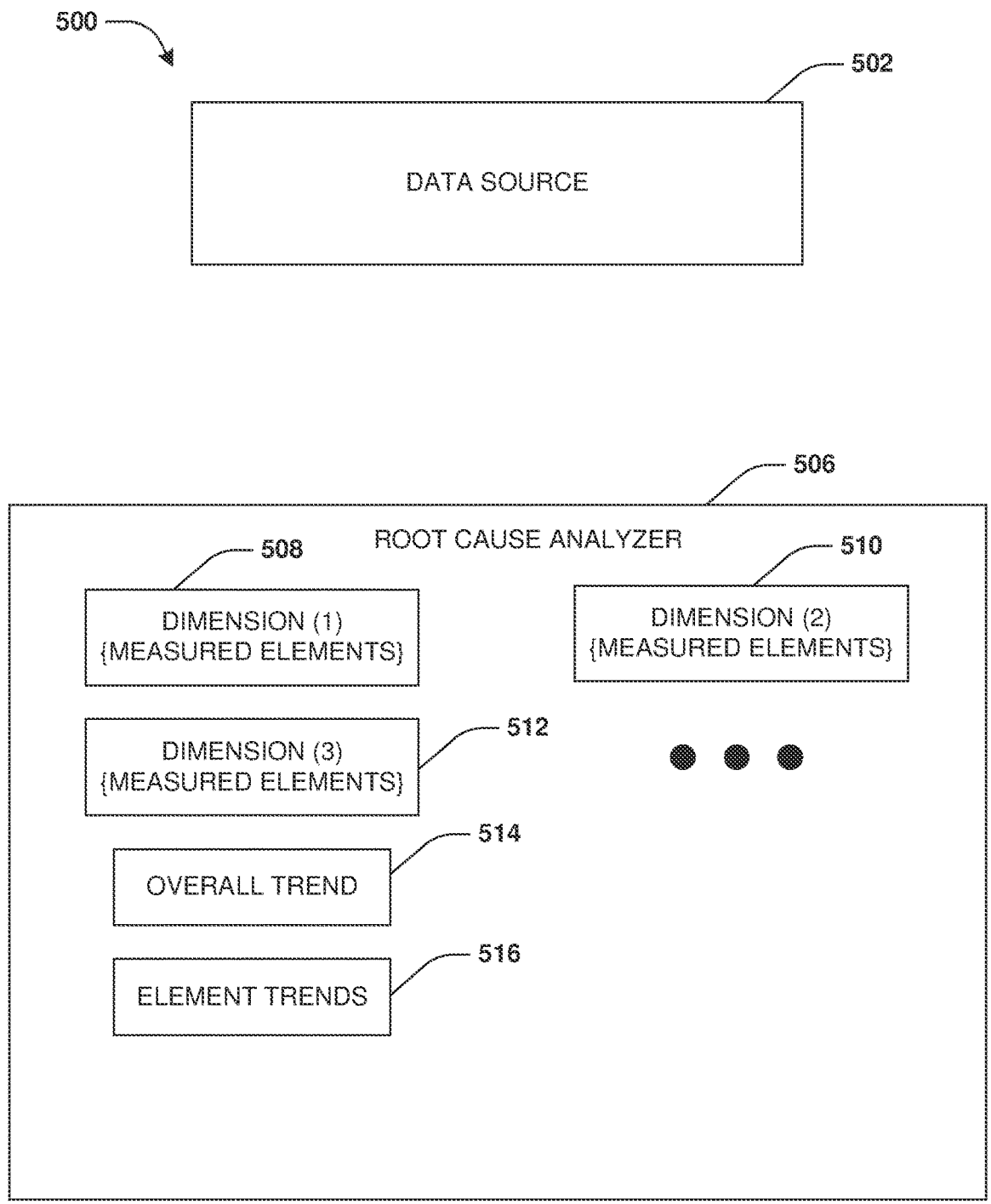
FIG. 5C is a component block diagram illustrating an example system for time series trend root cause identification, where element trends are identified.

During operation 406 of method 400 of FIG. 4, element trends 516 of measured elements of the dimensions within the multi-dimensional time series data may be identified, as illustrated by FIG. 5C. For example, the root cause analyzer 506 may evaluate the multi-dimensional time series data to determine an increasing element trend of users within an age group of 50 to 60 accessing the website. In another example, the root cause analyzer 506 may evaluate the multi-dimensional time series data to determine a decreasing element trend of client devices with a particular browser type and version not posting social network posts through a social network service, which may be indicative of an incompatibility issue or bug causes that browser type and version to not be able to access the social network service or post social network posts through the social network service.

Figure 5D:
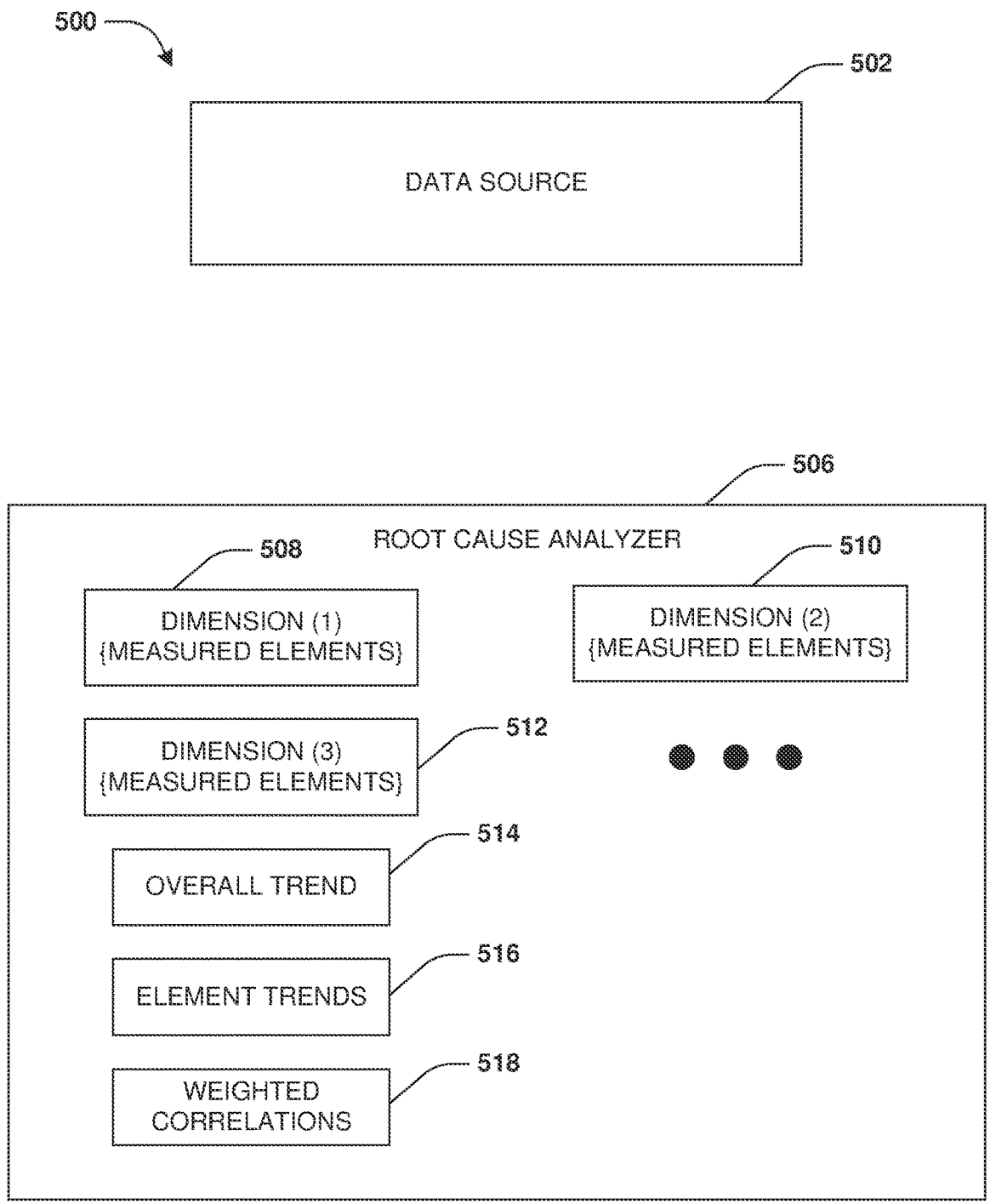
FIG. 5D is a component block diagram illustrating an example system for time series trend root cause identification, where weighted correlations are identified.

During operation 408 of method 400 of FIG. 4, weighted correlations 518 between the element trends 516 and the overall trend 514 are calculated, as illustrated by FIG. 5D. For example, the root cause analyzer 506 may compare the element trends 516 to the overall trend 514 in order to calculate the weighted correlations 518. A weighted correlation of an element trend of a measured element may correspond to how similar the element trend is to the overall trend 514, such as where the more similar the element trend is to the overall trend 514, the larger the weighted correlation. As a simplified example, the overall trend 514 is a decreasing trend of users posting social network posts through the social network service. Accordingly, a first element trend indicating a decreasing trend of client devices with a first operating system type posting social network posts through the social network service will be assigned a larger weighted correlation than a second element trend indicating an increasing trend of client devices with a second operating system type posting social network posts through the social network service. In this way, the root cause analyzer 506 calculates the weighted correlations 518 between the element trends 516 of the measured elements and the overall trend 514 of the multi-dimensional time series data. In some embodiments, a weighted correlation corresponds to a weighted Pearson correlation or other type of correlation.

During operation 410 of method 400 of FIG. 4, the root cause analyzer 506 evaluates the weighted correlations 518 of the element trends 516 of the measured elements and aggregate weighted correlations of measured element combinations to identify a set of measured elements having a threshold correlation to the trend of the multi-dimensional time series data, such as the overall trend 514. An aggregate weighted correlation corresponds to a weighted correlation for a combination of one or more measured elements, of a dimension, within a candidate set of the dimension. The aggregate weighted correlations may be determined based upon an iterative process that evaluates each dimension, and also iteratively evaluates each measured element within a dimension based upon various thresholds.

Figure 5E:
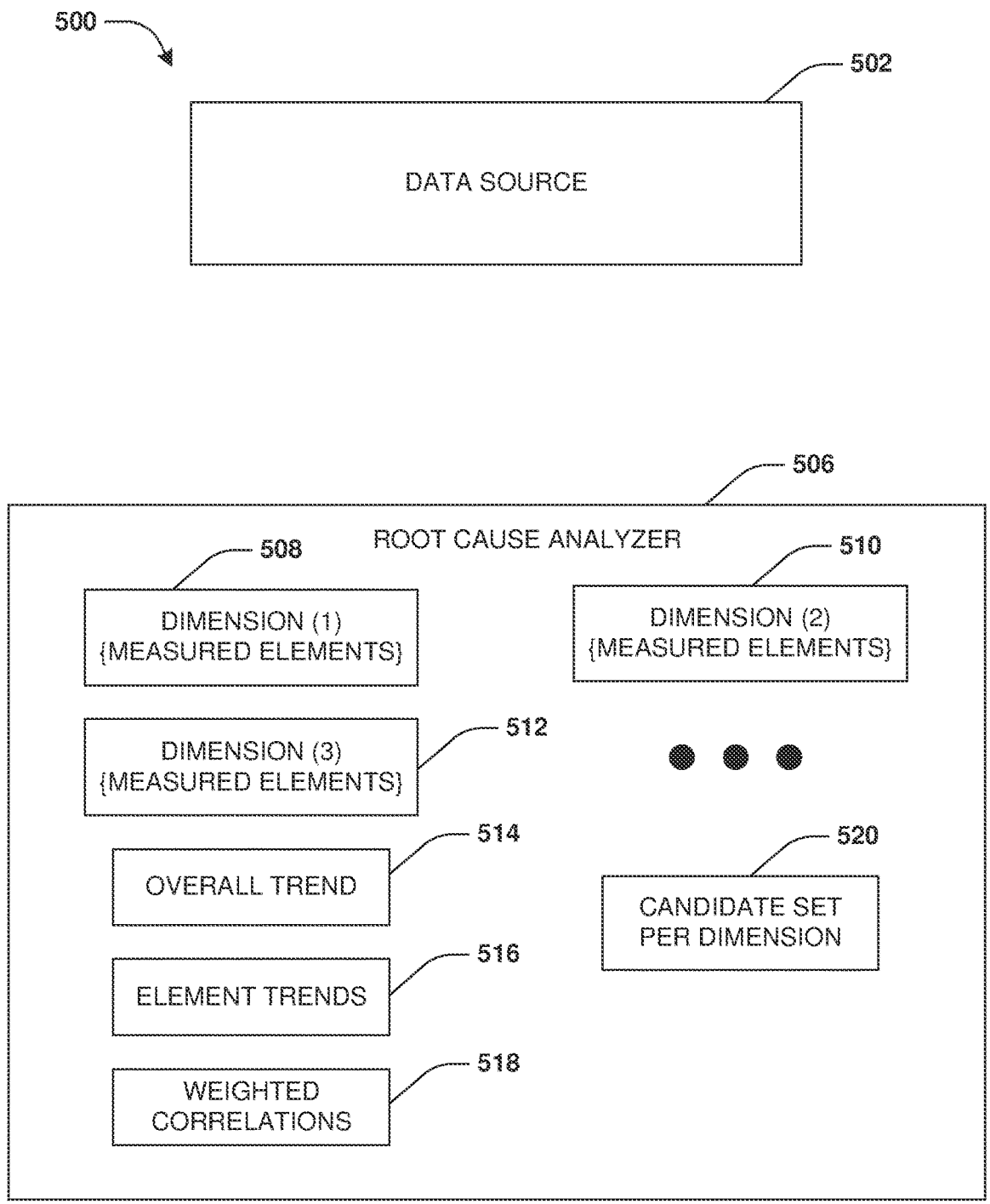
FIG. 5E is a component block diagram illustrating an example system for time series trend root cause identification, where candidate sets are created for dimensions.

In some embodiments of identifying the set of measured elements, each dimension of the multi-dimensional time series data is evaluated by the root cause analyzer 506, and results of the analysis may be stored within candidate sets 520 per dimension, as illustrated by FIG. 5E. For a dimension (e.g., the first dimension 508), a candidate set is initialized for the dimension. The measured elements within the dimension are sorted based upon weighted correlations of the measured elements to create a sorted set of measured elements for the dimension. In an example, the sorted set of measured elements for the dimension is sorted according to weighted correlations in descending order.

For each measured element within the dimension being currently evaluated (e.g., for each measured element within the first dimension 508), a weighted correlation of a measured element is compared to a minimum threshold. If the weighted correlation of the measured element is greater than the minimum threshold, then the measured element may be added into the candidate set for the dimension. This is because the measured element may have enough of a correlation to the trend to potentially be a root cause of the trend. If the weighted correlation of the measured element is less than the minimum threshold, then the measured element is not added into the candidate set for the dimension. This is because the measured element may not have enough of a correlation to the trend to potentially be a root cause of the trend.

The minimum threshold may be set as a minimum weighted correlation value, where measured elements with weighted correlations below the minimum weighted correlation value have too small of a correlation to the trend, such as to the overall trend 514 of the multi-dimensional time series data, to be a root cause of the trend. Thus, these measured elements, having low correlation to the trend, are discarded from being further processed. This will greatly reduce the amount of data, such as measured elements, to process for identifying the root cause of the trend. Reducing the amount of data to process (reducing the dimensional search space) will reduce the amount of computing resources otherwise consumed by the root cause analyzer 506 for identify root causes of the trend. Reducing the large amount of multi-dimensional time series data into a relatively lower dimensional search space allows for the root cause analyzer 506 to process large multi-dimensional time series data that would otherwise be too impractical to process. In some embodiments, the minimum threshold may be a user defined threshold or a predefined threshold. The minimum threshold may be adjusted based upon whether the root cause analyzer 506 identify a root cause of the trend and/or how many root causes of the trend were identified by the root cause analyzer 506 (e.g., if more than a threshold number of root causes were identified for the trend, then the minimum threshold may be increased; if less than the threshold of root causes were identified for the trend, then the minimum threshold may be decreased; etc.).

As measured elements are adding into the candidate set for the dimension, an aggregate weighted correlation for the combination of measured elements within the candidate set is calculated (and/or re-calculated as more measured elements are added into the candidate set for the dimension). As a simplified example, the dimension may be a state dimension with 50 measured elements of states from which client devices were located when accessing the service provider. If a weighted correlation for a state exceeds the minimum threshold, then the state is added into the candidate set for the state dimension, otherwise, the state is not added into the candidate set. As states are added into the candidate set for the state dimension, an aggregate weighted correlation may be calculated for the states within the candidate set for the state dimension (e.g., an aggregate weighted correlation may be calculated based upon weighted correlations of 5 states within the candidate set for the state dimension).

Figure 5F:
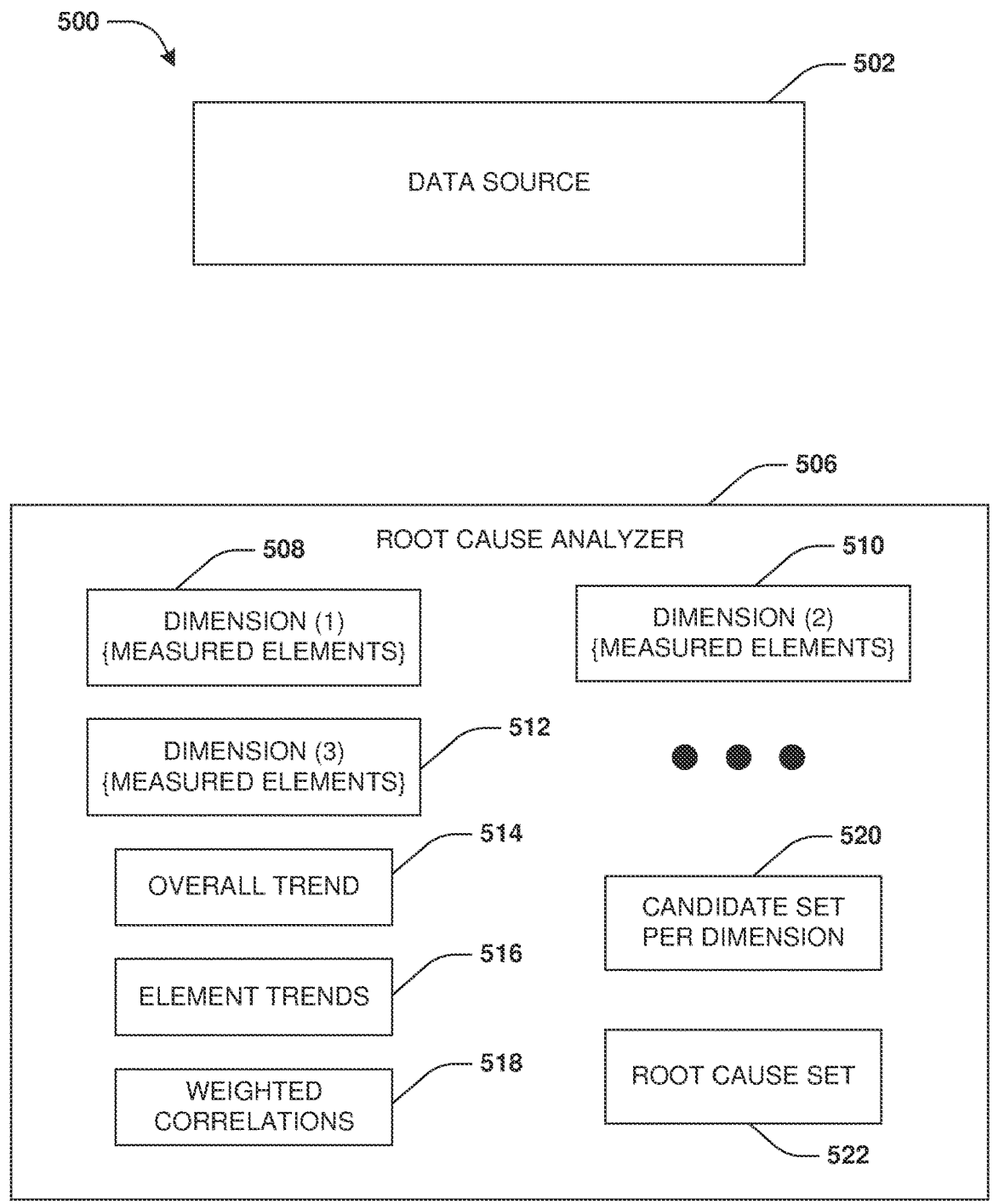
FIG. 5F is a component block diagram illustrating an example system for time series trend root cause identification, where a root cause set is created.

If the aggregate weighted correlation for a combination of measured elements within the candidate set for the dimension exceeds a maximum threshold, then the dimension and the measured elements within the candidate set for the dimension are added into a root cause set 522 as a root cause of the trend, as illustrated by FIG. 5F. That is, if the aggregate weighted correlation for the combination of the measured elements within the candidate set for the dimension exceeds the maximum threshold, then there is a large enough of a correlation between the combination of measured elements and the trend for the dimension and/or the combination of measured elements to potentially be an actual root cause of the trend (e.g., the state dimension and the 5 states may be a root cause of the trend). Otherwise, if the aggregate weighted correlation for the combination of measured elements within the candidate set for the dimension does not exceeds the maximum threshold, then the dimension and the measured elements within the candidate set for the dimension are not added into the root cause set 522 as the root cause. This is because the dimension and the measured elements do not have enough of a correlation to the trend to likely be the actual root cause of the trend (e.g., the state dimension is likely not a root cause of the trend). This also helps reduce the dimensional search space.

The maximum threshold may be set as a maximum aggregate weighted correlation value where combinations of measured elements having aggregate weighted correlations equal to or greater than the maximum aggregate weighted correlation value may have a strong correlation to being an actual root cause of the trend. Dimensions with candidate sets of measured elements having aggregate weighted correlations below the maximum aggregate weighted correlation value may have too low of a correlation to the trend to be an actual root cause of the trend. Thus, these dimensions and measured elements, having low correlation to the trend, are discarded from being further processed. This will greatly reduce the amount of data, such as dimensions and measured elements, to consider for identifying the root cause of the trend. Reducing the amount of data to process (reducing the dimensional search space) will reduce the amount of computing resources otherwise consumed by the root cause analyzer 506 for identify root causes of the trend. Reducing the large amount of multi-dimensional time series data into a relatively lower dimensional search space allows for the root cause analyzer 506 to process large multi-dimensional time series data that would otherwise be too impractical to process. In some embodiments, the maximum threshold may be a user defined threshold or a predefined threshold. The maximum threshold may be adjusted based upon whether the root cause analyzer 506 identify a root cause of the trend and/or how many root causes of the trend were identified by the root cause analyzer 506 (e.g., if more than a threshold number of root causes were identified for the trend, then the maximum threshold may be increased; if less than the threshold of root causes were identified for the trend, then the maximum threshold may be decreased; etc.).

Once the dimension (the first dimension 508) has been processed and has been either added along with the measured elements within the candidate set of the dimension into the root cause set 522 or not, a next dimension is processed, such as the second dimension 510. The second dimension 510 may be processed in a similar iterative manner as the first dimension 508 in order to determine whether the second dimension 510 and/or any measured elements of the second dimension 510 that are added into a candidate set for the second dimension during processing of the second dimension 510 should be added into the root cause set 522 or not.

Once the dimensions have been processed by the root cause analyzer 560 and the root cause set 522 has been populated with root causes of dimensions and measured elements of those dimensions, the root cause set 522 may be sorted based upon various factors to create a sorted root cause set. The root causes within the root cause set 522 may be sorted based upon counts of measured elements within the root causes. For example, a root cause corresponds to a single dimension and measured elements of that dimension that were within a candidate set for the dimension, and thus the root cause may be sorted based upon a count of the measured elements. The root causes within the root cause set 522 may be sorted based upon the aggregate weighted correlations of the root causes. For example, an aggregate weighted correlation of a combination of measured elements of a dimension of a root cause may be used to sort that root cause.

An N number of top sorted root causes may be identified within the sorted root cause set. N may be an integer number of root causes that are sorted the highest within the sorted root cause set indicating that those root causes are the most likely root causes of the trend. The N number of top sorted root causes may be user defined or predefined. For example, a user may specify a larger N value in order to obtain more insight (more potential root causes) into the root causes of the trend, or the user may specify a smaller N value in order obtain succinct root cause information. The user may dynamically modify the N value in order to change the granularity of results provided to the user as root causes of the trend. Dimensions within the N number of top sorted root causes may be identified as dimensions relevant to the root cause of the trend. Measured elements within those dimensions may be identified as the set of elements that are relevant to the root cause of the trend.

Figure 5G:
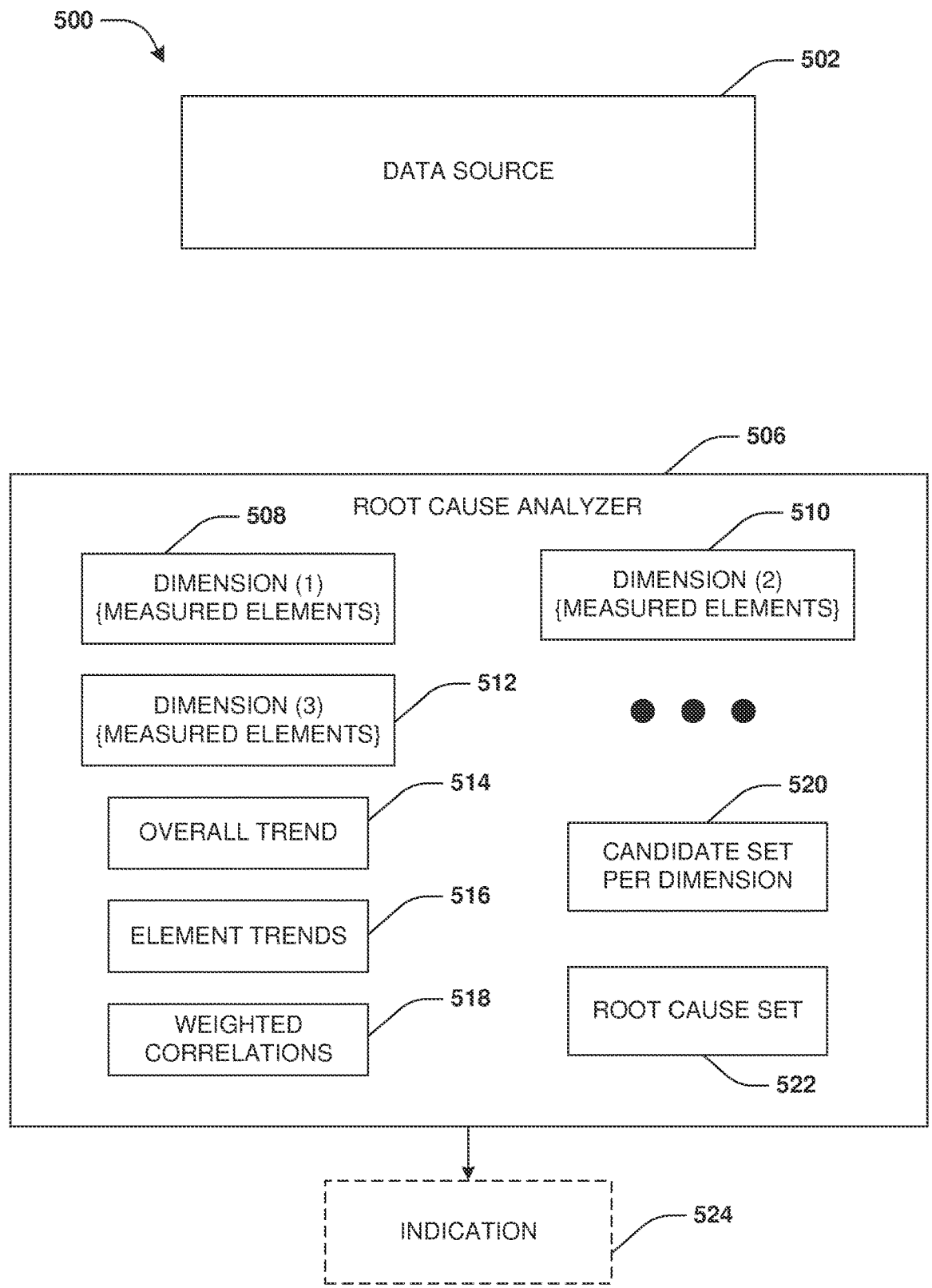
FIG. 5G is a component block diagram illustrating an example system for time series trend root cause identification, where an indication of a root cause is provided.

During operation 412 of method 400 of FIG. 4, an indication 524 is provided to a user, such as through a user interface, a message, or other communication means for providing information to users, as illustrated by FIG. 5G. The indication 524 may describe the dimensions, the measured elements, and/or the weighted correlations of the measured elements within the N number of top sorted root causes within the sorted root cause set. In an embodiment, the root cause analyzer 506 may evaluate the dimensions, the measured elements, and/or the weighted correlations to determine whether a root cause of the trend corresponds to an operational issue (e.g., an inability of a client device with a particular operating system version to access a service provider having a decreasing trend of being accessed, thus indicating an operational issue blocking those client devices from accessing the service provider) or merely relates to some non-operational causation factor that caused the trend (e.g., a holiday season caused an increase of traffic to a shopping website). If the root cause analyzer 506 determines that the root cause corresponds to the operational issue, then a resolution request may be generated and routed to an entity (e.g., an administrator of the service provider) for resolution of the operational issue.

Figure 6A:
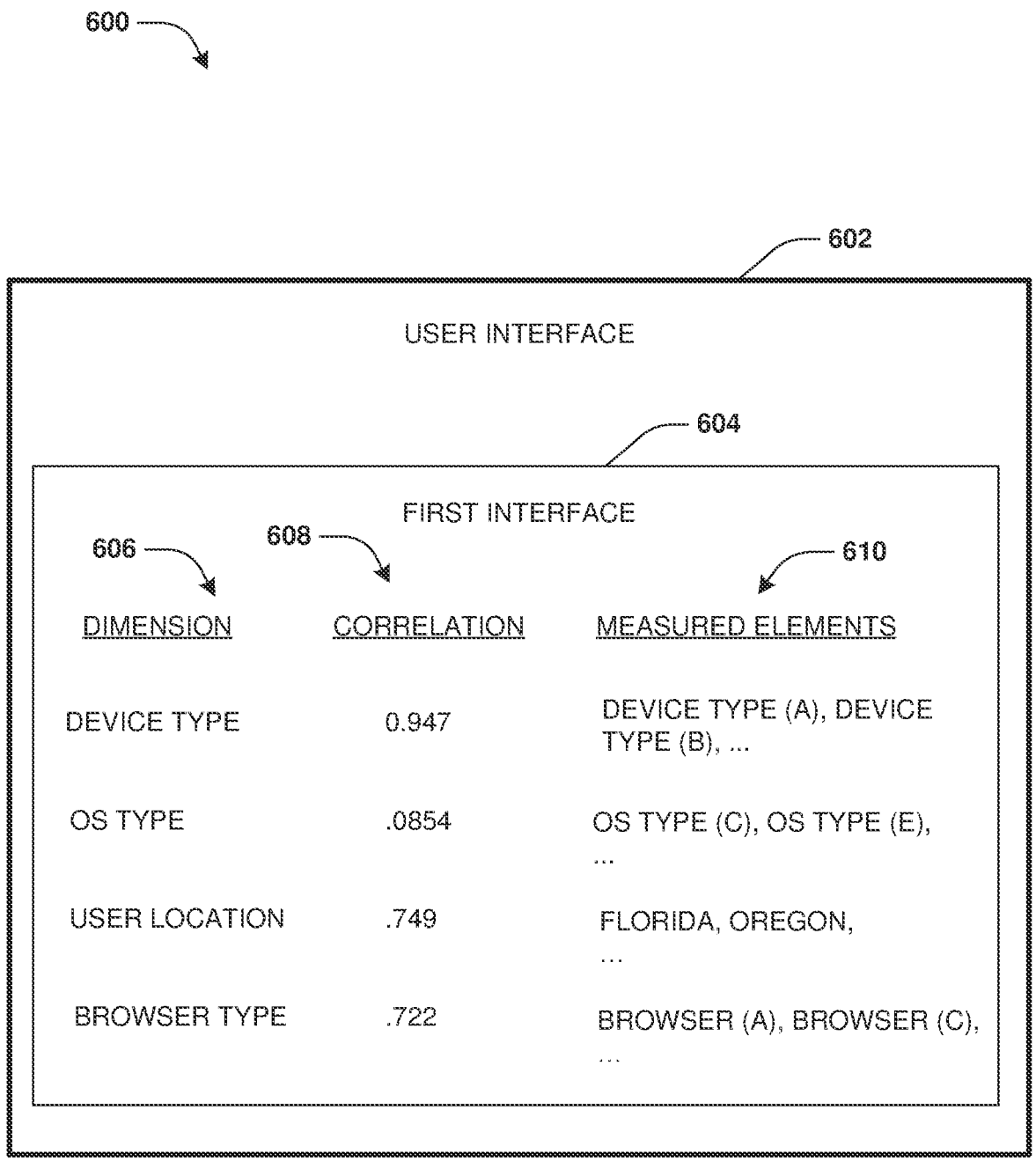
FIG. 6A is an illustration of an example user interface.
Figure 6B:
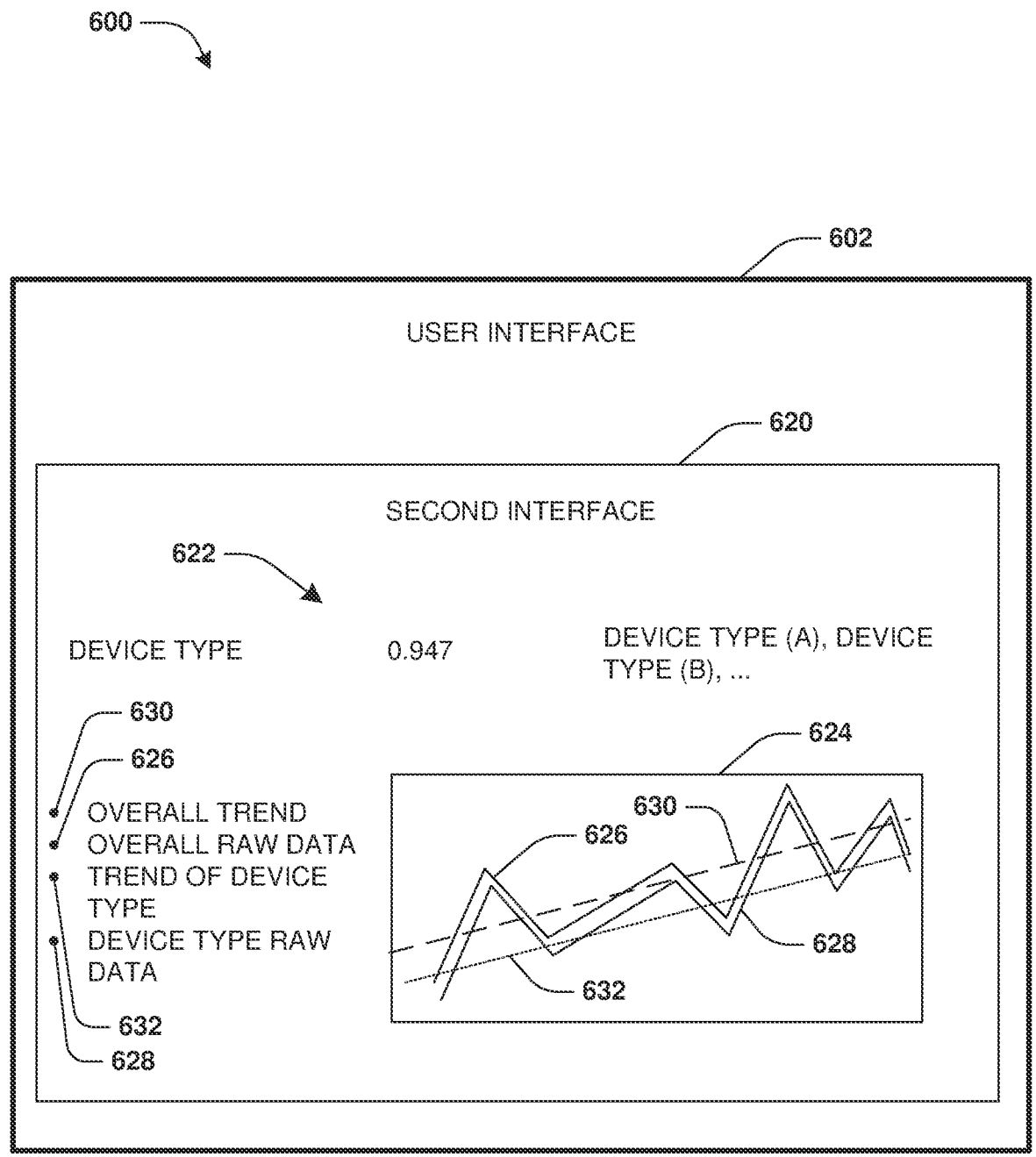
FIG. 6B is an illustration of an example user interface.

In some embodiments, the indication 524 may be provided through a user interface 602, as illustrated by example 600 of FIGS. 6A and 6B. The user interface 602 may be populated with a first interface 604, as illustrated by FIG. 6A. The first interface 604 may be populated with dimensions 606 and/or measured elements 610 within the K number of top root causes. The first interface 604 may be populated with correlation data 608, such as weighted correlations of the measured elements 610 or aggregate weighted correlations of the dimensions 606 (e.g., an aggregate weighted correlation of a combination of a device type (A), a device type (B), and/or other measured elements within a root cause associated with a device type dimension).

In response to a user interacting with the first interface 604, such as selecting the device type dimension, the user interface 602 may be transitioned to a second interface 620, as illustrated by FIG. 6B. The second interface 620 may be populated with information 622 related to the device type dimensions. In an example, the second interface 620 is populated with a graph 624 comprising an overall trend plot 630 of the multi-dimensional time series data, overall raw data plot 626 of the multi-dimensional time series data, a trend plot 632 of the device type dimension, and a device type raw data plot 628 of the device type dimension. It may be appreciated that a variety of other information may be populated within the first interface 604 and/or the second interface 620.

Figure 7:
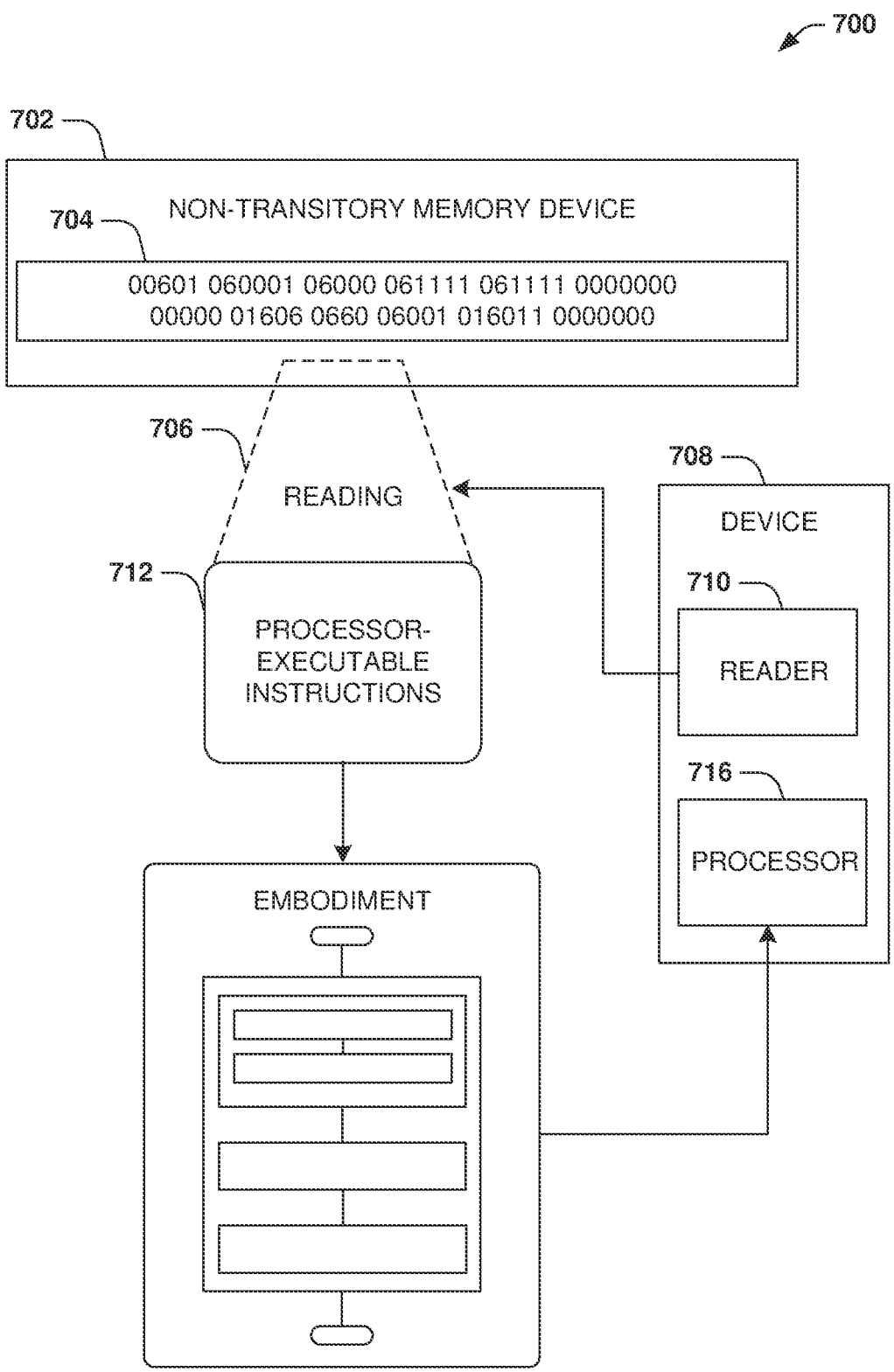
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 400 of FIG. 4, for example. In some embodiments, the processor-executable instructions 712 are configured to cause implementation of a system, such as at least some of the example system 500 of FIG. 5A-5G, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
executing, on a processor of a computing device, instructions that cause the computing device to perform operations, the operations comprising:
identifying a set of data, wherein the set of data is organized into multi-dimensional time series data comprising one or more dimensions of measured elements comprising a first measured element and a second measured element;
identifying an overall trend of the multi-dimensional time series data;
identifying element trends, for the measured elements, comprising a first element trend of the first measured element and a second element trend of the second measured element;
calculating weighted correlations between the element trends of the measured elements and the overall trend,
wherein the weighted correlations comprise:
a first weighted correlation between (i) the first element trend and (ii) the overall trend; and
a second weighted correlation between (i) the second element trend and (ii) the overall trend;
determining aggregate weighted correlations of measured element combinations comprising an aggregate weighted correlation for a combination of (i) the first measured element having the first element trend and (ii) the second measured element having the second element trend;
using the overall trend to evaluate the weighted correlations of the measured elements and the aggregate weighted correlations of the measured element combinations to iteratively identify a set of measured elements having a threshold correlation to the overall trend, wherein the using the overall trend to evaluate the weighted correlations and the aggregate weighted correlations comprises including, in the set of measured elements, the combination of (i) the first measured element having the first element trend and (ii) the second measured element having the second element trend based upon the aggregate weighted correlation for the combination having the threshold correlation to the overall trend;
providing an indication of the set of measured elements, including the combination of (i) the first measured element having the first element trend and (ii) the second measured element having the second element trend, as a root cause of the overall trend, wherein the indication includes a number of top sorted root causes, comprising the root cause, populated in a first interface displayed through a user interface;
transitioning the user interface from displaying the first interface to displaying a second interface populated with information related to a dimension of at least one of the first measured element or the second measured element;
evaluating the indication of the set of measured elements to determine whether the root cause of the overall trend corresponds to an operational issue or a non-operational causation factor;
responsive to determining that the root cause of the overall trend corresponds to the operational issue, generating a resolution request for the operational issue corresponding to the root cause of the overall trend; and
routing the resolution request to an entity for resolution.

2. The method of claim 1, wherein the transitioning the user interface from displaying the first interface to displaying the second interface is performed responsive to a user interaction with the dimension in the first interface.

3. The method of claim 1, wherein the information related to the dimension populated in the second interface comprises:
a graph representative of at least some of the multi-dimensional time series data.

4. The method of claim 1, wherein the evaluating comprises:
sorting measured elements within a dimension, of the one or more dimensions, based upon weighted correlations of the measured elements to create a sorted set.

5. The method of claim 4, wherein the evaluating comprises:
if a weighted correlation of a measured element is greater than a minimum threshold, adding the measured element into a candidate set.

6. The method of claim 1, comprising:
sorting root causes within a root cause set, comprising the root cause, to create a sorted root cause set based upon counts of measured elements within the root causes and aggregate weighted correlations of the root causes.

7. The method of claim 6, comprising:
identifying dimensions within a number of top sorted root causes within the sorted root cause set.

8. The method of claim 7, comprising:
identifying one or more measured elements within the dimensions as the set of measured elements that are the root cause of the overall trend.

9. The method of claim 7, wherein the number of top sorted root causes corresponds to a user defined number.

10. The method of claim 1, wherein the non-operational causation factor is associated with a seasonal factor.

11. A non-transitory machine readable medium having stored thereon processor-executable instructions that when executed cause performance of operations, the operations comprising:
identifying an overall trend of multi-dimensional time series data and element trends for measured elements of dimensions within the multi-dimensional time series data, wherein the measured elements comprise a first measured element and a second measured element, wherein the element trends comprise a first element trend of the first measured element and a second element trend of the second measured element;

calculating weighted correlations between the element trends of the measured elements and the overall trend, wherein the weighted correlations comprise:
a first weighted correlation between (i) the first element trend and (ii) the overall trend; and
a second weighted correlation between (i) the second element trend and (ii) the overall trend;

determining aggregate weighted correlations of measured element combinations comprising an aggregate weighted correlation for a combination of (i) the first measured element having the first element trend and (ii) the second measured element having the second element trend;

using the overall trend to evaluate the weighted correlations of the measured elements and the aggregate weighted correlations of the measured element combinations to iteratively identify a set of measured elements having a threshold correlation to the overall trend, wherein the using the overall trend to evaluate the weighted correlations and the aggregate weighted correlations comprises including, in the set of measured elements, the combination of (i) the first measured element having the first element trend and (ii) the second measured element having the second element trend based upon the aggregate weighted correlation for the combination having the threshold correlation to the overall trend;

providing an indication of the set of measured elements, including the combination of (i) the first measured element having the first element trend and (ii) the second measured element having the second element trend, as a root cause of the overall trend, wherein the indication includes a number of top sorted root causes, comprising the root cause, populated in a first interface displayed through a user interface; and transitioning the user interface from displaying the first interface to displaying a second interface populated with information related to a dimension of at least one of the first measured element or the second measured element.

12. The non-transitory machine readable medium of claim 11, wherein the operations comprise:
populating the user interface with dimensions within which the set of measured elements are contained.

13. The non-transitory machine readable medium of claim 11, wherein the operations comprise:
populating the user interface with the weighted correlations of the measured elements within the set of measured elements.

14. The non-transitory machine readable medium of claim 11, wherein the operations comprise:
populating the user interface with a graphical illustration of trend data associated with at least one of the multi-dimensional time series data, a measured element associated with the root cause, or a dimension associated with the root cause.

15. The non-transitory machine readable medium of claim 11, wherein the operations comprise:
in response to receiving user input through the user interface, transitioning from the second interface to a third interface populated with second trend data associated with a second dimension.

16. The non-transitory machine readable medium of claim 11, wherein the operations comprise:

receiving user input specifying a number of measured elements to consider as the root cause of the overall trend; and
constraining a number of measured elements within the set of measured elements based upon the user input.

17. The non-transitory machine readable medium of claim 11, wherein the operations comprise:
receiving user input specifying a number of dimensions to consider as the root cause of the overall trend; and
constraining the set of measured elements to comprise measured elements within the number of dimensions based upon the user input.

18. A computing device comprising:
a processor; and
memory comprising processor-executable instructions that when executed by the processor cause performance of operations, the operations comprising:
identifying an overall trend of multi-dimensional time series data and element trends for measured elements of dimensions within the multi-dimensional time series data, wherein the multi-dimensional time series data corresponds to at least one of user interaction data, system diagnostic data, manufacturing data, software service data, or cloud computing operation data, wherein the measured elements comprise a first measured element and a second measured element, wherein the element trends comprise a first element trend of the first measured element and a second element trend of the second measured element;

calculating weighted correlations between the element trends of the measured elements and the overall trend,
wherein the weighted correlations comprise:
a first weighted correlation between (i) the first element trend and (ii) the overall trend; and
a second weighted correlation between (i) the second element trend and (ii) the overall trend;

determining aggregate weighted correlations of measured element combinations comprising an aggregate weighted correlation for a combination of (i) the first measured element having the first element trend and (ii) the second measured element having the second element trend;

using the overall trend to evaluate the weighted correlations of the measured elements and the aggregate weighted correlations of the measured element combinations to iteratively identify a set of measured elements having a threshold correlation to the overall trend, wherein the using the overall trend to evaluate the weighted correlations and the aggregate weighted correlations comprises including, in the set of measured elements, the combination of (i) the first measured element having the first element trend and (ii) the second measured element having the second element trend based upon the aggregate weighted correlation for the combination having the threshold correlation to the overall trend;

providing an indication of the set of measured elements including the combination of (i) the first measured element having the first element trend and (ii) the second measured element having the second element trend, wherein the indication includes a number of top sorted root causes populated in a first interface displayed through a user interface; and transitioning the user interface from displaying the first interface to displaying a second interface populated with information related to a dimension of at least one of the first measured element or the second measured element.

19. The computing device of claim 18, wherein the operations comprise:
   receiving user input specifying a number of measured elements to consider as a root cause of the overall trend; and
   constraining a number of measured elements within the set of measured elements based upon the user input.

20. The computing device of claim 18, wherein the operations comprise:
   receiving user input specifying a number of dimensions to consider as a root cause of the overall trend; and
   constraining the set of measured elements to comprise measured elements within the number of dimensions based upon the user input.

* * * * *